United States Patent
Chen et al.

(10) Patent No.: US 7,564,614 B2
(45) Date of Patent: Jul. 21, 2009

(54) ELECTRODE PROTECTION FILM FOR ELECTROPHORETIC DISPLAYS

(75) Inventors: Yajuan Chen, Fremont, CA (US); Xin Weng, Cotati, CA (US); Xiaojia Wang, Fremont, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 288 days.

(21) Appl. No.: 11/133,134

(22) Filed: May 18, 2005

(65) Prior Publication Data

US 2005/0264869 A1 Dec. 1, 2005

Related U.S. Application Data

(60) Provisional application No. 60/573,715, filed on May 20, 2004.

(51) Int. Cl.
*G02B 26/00* (2006.01)
(52) U.S. Cl. .................................. 359/296; 359/295
(58) Field of Classification Search ............... 359/296, 359/295; 428/402, 402.2, 402.21, 402.22, 428/402.24, 327
See application file for complete search history.

(56) References Cited

U.S. PATENT DOCUMENTS

| | | | |
|---|---|---|---|
| 3,612,758 A | 10/1971 | Evans | |
| 5,930,026 A | 7/1999 | Jacobson et al. | |
| 5,961,804 A | 10/1999 | Jacobson et al. | |
| 6,017,584 A * | 1/2000 | Albert et al. | 427/213.3 |
| 6,661,563 B2 * | 12/2003 | Hayashi et al. | 359/296 |
| 6,788,449 B2 | 9/2004 | Liang et al. | |
| 2005/0007648 A1 * | 1/2005 | Wu et al. | 359/296 |

OTHER PUBLICATIONS

U.S. Appl. No. 09/518,488, filed Mar. 2000, Liang et al.
U.S. Appl. No. 09/874,391, filed Jun. 2001, Zang et al.
U.S. Appl. No. 10/351,460, filed Jan. 2003, Liang et al.
U.S. Appl. No. 10/618,257, filed Jul. 2003, Wu et al.
U.S. Appl. No. 10/651,540, filed Aug. 2003, Pereira et al.
U.S. Appl. No. 10/762,196, filed Jan. 2004, Wang et al.
U.S. Appl. No. 10/788,628, filed Feb. 2004, Pereira et al.
Allen, K. (Oct. 2003). Electrophoretics Fulfilled. *Emerging Displays Review: Emerging Display Technologies, Monthly Report*—Oct. 2003, 9-14.
Bardsley, J.N. & Pinnel, M.R. (Nov. 2004). Microcup™ Electrophoretic Displays. *USDC Flexible Display Report*, 3.1.2. pp. 3-12-3-16.
Bicerano, J. (2002) *Prediction of Polymer Properties*. 3rd edition, Marcel Dekker.
Borsenberger and Weiss, (1991) "Photoreceptors : Organic Photoconductors", in *Handbook of Imaging Materials*, Diamond, A.S. ed., pp. 379, Marcel Dekker Inc.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

(Continued)

*Primary Examiner*—Scott J Sugarman
*Assistant Examiner*—Brandi N Thomas
(74) *Attorney, Agent, or Firm*—Howrey LLP (57) ABSTRACT

The invention is directed to methods and compositions useful for enhancing adhesion and protecting electrode layers from corrosion, rust or oxidation.

9 Claims, 4 Drawing Sheets

OTHER PUBLICATIONS

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10. (In Chinese, English abstract attached, full translation available upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Flick, Ernest W., (1993) *Corrosion Inhibitors—An Industrial Guide, Second Edition*, Noyes Publications.

Ho, Candice. (Feb. 1, 2005) *Microcup® Electronic Paper Device and Application*. Presentation conducted at USDC 4th Annual Flexible Display Conference 2005.

Ho, C., & Liang, R.C. (Dec. 2003). *Microcup (R) Electronic Paper by Roll-to-Roll Manufacturing Processes*. Presentation conducted at FEG, Nei-Li, Taiwan.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Ku, C.C. & Liepins, R., (1987) *Electrical Properties of Polymers: Chemical Principles*, Hanser Publishers (1993 version is not available).

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003) Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufactuing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Licari, James J., (1981) *Plastic Coatings for Electronics*, Robert E. Krieger Publishing Company.

Nikkei Microdevices. (Dec. 2002) Newly-Developed Color Electronic Paper Promises—Unbeatable Production Efficiency. *Nikkei Microdevices*, 3. (in Japanese, with English translation).

Simpson, C., (Apr. 1997) Improved Corrosion-inhibiting Pigments. *Chemtech*, vol. 27, No. 4, pp. 40-42 [retrieved on Aug. 4, 2005] Retrieved from the Internet: URL :http://pubs.acs.org/hotartcl/chemtech/97/apr/improv.html.

Vastag, et al. (2001) New Inhibitors for Copper Corrosion. *Pure Appl. Chem.* vol. 73, No. 12, pp. 1861-1869.

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceedings of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

\* cited by examiner

ELECTRODE PROTECTION FILM FOR ELECTROPHORETIC DISPLAYS

RELATED APPLICATION

This application claims the priority under 35 USC 119(e) of U.S. Provisional Application No. 60/573,715 filed on May 20, 2004, the content of which is incorporated herein by reference in its entirety.

BACKGROUND OF THE INVENTION

1. Field of the Invention

The invention is directed to methods and compositions useful for enhancing adhesion and protecting electrode layers from corrosion, rust or oxidation.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, *IEEE Trans. Electr. Dev.*, 26(8):1148-1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. To complete the module assembly, the microcapsules may be coated directly on an electrode and subsequently laminated with a second electrode layer. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in a co-pending application, U.S. Ser. No. 09/518,488 filed on Mar. 3, 2000 (corresponding to WO 01/67170), the content of which is incorporated herein by reference in its entirety. The improved EPD cells may be prepared, for example, by microembossing a layer of a thermoplastic or thermoset precursor composition coated on a first substrate layer to form microcups of well-defined shape, size and aspect ratio. The microcups are then filled with an electrophoretic fluid and top-sealed with a sealing layer. A second substrate layer is laminated over the filled and sealed microcups, preferably with an adhesive layer.

Another co-pending application, U.S. Ser. No. 10/351,460 filed on Jan. 24, 2003, discloses finished and semi-finished display panels prepared from the microcup technology. The content of U.S. Ser. No. 10/351,460 is also incorporated herein by reference in its entirety.

For an electrophoretic display having an up/down or dual switching mode, a display cell layer is sandwiched between two electrode layers. For an electrophoretic display having an in-plane switching mode, a display cell layer is sandwiched between an insulating layer and an electrode layer.

The electrode layer may be a thin film transistor (TFT) back plane or a printed circuit board (PCB), particularly a flexible PCB. Unfortunately, it is a well-known problem that the electrode (such as copper) traces and some solders or conductor coatings or inks typically used in PCBs or a TFT back plane are susceptible to corrosion, rust or oxidation. As a result, the surface color of the electrode layer has a tendency to turn from a bright and shiny color to a reddish color with an uneven pattern, after prolonged exposure to air and/or humidity. The oxidation of the electrode traces, solders and conductive coatings or inks not only causes a color change and forms a pattern of an uneven color, but also causes a reduction in conductivity and an adverse effect on adhesion of the electrode layer to other components in the display.

This problem may be solved by protecting the electrode layer surface from corrosion, rust or oxidation by, for example, coating a protective coating such as a solder mask or an inert conductive material, such as gold, over the surface of the electrode layer soon after the electroplating, lithographic or printing steps. However, the solder mask is a thick, rigid and thermally resistant thermoset coating and it is designed to be non-tacky and therefore is not suitable as an adhesive. The gold coating, on the other hand, is expensive and the adhesion of gold to conventional adhesives is not suitable for many applications.

The need of protecting the electrode surface during handling, storage and shipping without the above-mentioned detrimental effect on the EPD performance presents a challenge in logistic or inventory control for mass production of EPD modules.

SUMMARY OF THE INVENTION

The present invention is directed to methods and compositions for not only enhancing the adhesion between the components of an electrophoretic display, but also protecting an electrode layer and/or the solder thereon from corrosion, rust or oxidation.

The first aspect of the present invention is directed to a method for enhancing adhesion between components in an electrophoretic display, which method comprises adding a metal corrosion inhibitor, particularly an organic metal corrosion inhibitor, to an electrode protecting layer or display cell layer.

The second aspect of the present invention is directed to a method for protecting an electrode layer and/or the solder thereon in an electrophoretic display from corrosion, rust or oxidation, which method comprises adding a metal corrosion inhibitor, particularly a copper (Cu), silver (Ag) or aluminum (Al) corrosion inhibitor, to at least one electrode protecting layer or a display cell layer in the electrophoretic display.

In the context of the present invention, the thickness of the electrode protecting layer is preferably less than 12 microns, more preferably less than 8 microns and most preferably less than 5 microns. In addition, the electrode protecting layer preferably has a dielectric constant not lower than that of the dielectric solvent in the electrophoretic fluid which is filled in the display cells of the electrophoretic display.

The third aspect of the present invention is directed to an electrode protecting layer composition comprising a metal corrosion inhibitor. The electrode protecting layer preferably has the properties (i.e., thickness and/or dielectric constant) as described above. The composition may further comprise a dye or pigment.

The fourth aspect of the present invention is directed to a display cell layer formed from a composition comprising a metal corrosion inhibitor.

The fifth aspect of the present invention is directed to an electrophoretic display comprising at least one electrode protecting layer which is formed from a composition comprising a metal corrosion inhibitor. The electrode protecting layer preferably has the properties (i.e., thickness and/or dielectric constant) as described above.

The sixth aspect of the present invention is directed to an electrophoretic display which comprises a display cell layer formed from a composition comprising a metal corrosion inhibitor.

The seventh aspect of the present invention is directed to a composite film comprising an adhesive layer of the present invention. In one embodiment, the composite film may comprise the adhesive layer laminated on a temporary substrate layer, a permanent substrate layer or an electrode layer. In another embodiment, the composite film may comprise the adhesive layer sandwiched between two temporary substrate layers. In another embodiment, the composite film may comprise the adhesive layer sandwiched between a permanent substrate layer and a temporary substrate layer. In yet another embodiment, the composite film may comprise the adhesive layer sandwiched between an electrode layer and a temporary substrate layer.

The present invention provides methods and compositions to ensure a fresh and reliable surface of the electrode layer even after prolonged exposure to air and/or humidity, at low cost. In addition, the use of a metal corrosion inhibitor, particularly an organic corrosion inhibitor, also enhances adhesion between components in an electrophoretic display.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations which may be created by methods such as microembossing or a photolithographic process as described in the co-pending application, U.S. Ser. No. 09/518,488 or a pre-punched hole process as described in another co-pending application Ser. No. 09/942,532 filed on Aug. 29, 2001.

The term "Dmax" refers to the maximum achievable optical density of the display.

The term "Dmin" refers to the minimum optical density of the display background.

The term "contrast ratio" refers to the ratio of the reflectance (% of light reflected) of the Dmin state to the reflectance of the Dmax state.

Figure 1A:
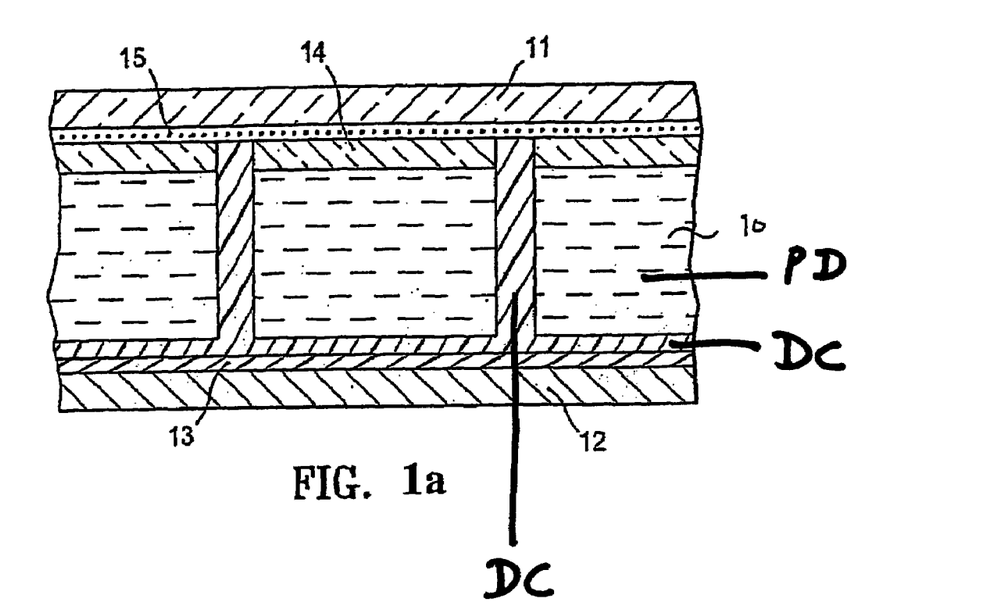
FIGS. 1a and 1b are schematic depiction of an electrophoretic display cell prepared by the microcup technology.
Figure 1B:
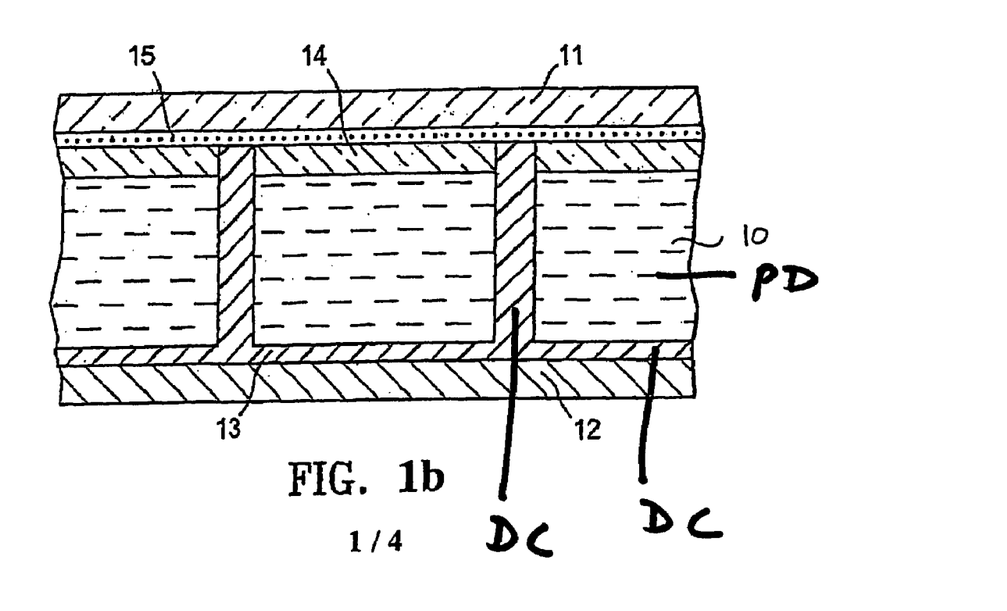

The term "electrode protecting layer" may be the primer layer (13), sealing layer (14) or adhesive layer (15) as shown in FIGS. 1a and 1b.

The term "display cell layer" refers to a layer of display cells, such as that (10) in FIGS. 1a and 1b. While the microcup-based display cells are extensively described in the present application, it is understood that, in the context of the present invention, the display cells may include display cells of all types, such as the conventional type of display cells, the display cells formed according to the microcup technology as disclosed in U.S. Ser. No. 09/518,488 filed on Mar. 3, 2000 or the display cells formed according to the microcapsule technology as disclosed in U.S. Pat. Nos. 5,961,804 and 5,930,026.

II. General Description of the Microcup Technology

FIGS. 1a and 1b depict typical display cells prepared by the microcup technology as disclosed in U.S. Ser. No. 09/518,488. The microcup-based display cell (10) is sandwiched between a first substrate layer (11) and a second substrate layer (12). For an electrophoretic display, at least one of the two substrate layers is an electrode layer and also at least one of the two substrate layers is transparent. A thin protective layer (13) is optionally present between the cell (10) and the second substrate layer (12) as seen in the figures. As shown in FIG. 1a, the layer (13) may be a primer layer (adhesion promoting layer) to improve the adhesion between the microcup material and the second substrate layer (12). Alternatively the layer (13) may be a thin layer of the microcup material (as shown in FIG. 1b) if the microcup array is prepared by an embossing process. The cell (10) is filled with an electrophoretic fluid comprising charged pigment particles dispersed in a dielectric solvent or solvent mixture and top-sealed with a sealing layer (14) on the open side of the microcup. The first substrate layer (11) is laminated onto the filled and top-sealed microcup, preferably with an adhesive (15).

For an electrophoretic display having an up/down or dual switching mode, the display cell layer is sandwiched between two electrode layers. In other words, both the first (11) and second (12) substrate layers in FIGS. 1a and 1b are electrode layers.

For an electrophoretic display having an in-plane switching mode, the display cell layer is sandwiched between an insulating layer and an electrode layer. In other words, one of the first (11) and second (12) substrate layers in FIGS. 1a and 1b is an insulating layer and the other is an electrode layer.

The display cell layer may be prepared by microembossing or photolithography as disclosed in U.S. Ser. No. 09/518,488, or by a prepunched hole process as disclosed in another co-pending application, U.S. Ser. No. 09/942,532, the contents of both of which are incorporated herein by reference in their entirety.

In the microembossing process, an embossable composition is coated onto the second substrate layer (12) and embossed under pressure to produce a microcup array. To improve the mold release property, the second substrate layer (12) may be pretreated with a thin primer layer (13) before coating the embossable composition.

The embossable composition may comprise a thermoplastic or thermoset material or a precursor thereof, such as multifunctional functional acrylates, methacrylates, allyls, epoxides, vinyls (such as vinylbenzenes or vinylethers) or other oligomers or polymers comprising crosslinkable functional groups. Multifunctional acrylate and oligomers thereof are the most preferred. A combination of a multifunctional epoxide and a multifunctional acrylate is also very useful to achieve desirable physico-mechanical properties. A low Tg binder or crosslinkable oligomer imparting flexibility, such as urethane acrylate or polyester acrylate, is usually also added to improve the flexure resistance of the microcups. The composition may contain an oligomer, a monomer, additives and optionally a polymer. The Tg (glass transition temperature) for the embossable composition usually ranges from about −70° C. to about 150° C., preferably from about −20° C. to about 50° C.

The microembossing process is typically carried out at a temperature higher than the Tg. A heated male mold or a heated housing against which the mold presses may be used to control the microembossing temperature and pressure.

The mold is released during or after the embossable composition is hardened to reveal the microcups (10). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the mold on to the embossable composition.

The composition of the primer layer is at least partially compatible with the embossing composition or the microcup material after curing. In practice, it may be the same as the embossing composition.

The microcups are then filled with an electrophoretic fluid and top-sealed as disclosed in U.S. Ser. No. 09/518,488 and U.S. Ser. No. 09/874,391, filed on Jun. 4, 2001 (corresponding to WO02/098977), the contents of both of which are incorporated herein by reference.

The sealing of the microcups may be accomplished in a number of ways. Preferably, it is accomplished by overcoating the filled microcups with a sealing composition comprising a solvent and a sealing material selected from the group consisting of thermoplastic elastomers, polyvalent acrylates or methacrylates, cyanoacrylates, polyvalent vinyls (such as vinylbenzene, vinylsilane or vinylether), polyvalent epoxides, polyvalent isocyanates, polyvalent allyls and oligomers or polymers containing crosslinkable functional groups.

Additives such as a polymeric binder or thickener, photoinitiator, catalyst, vulcanizer, filler, colorant or surfactant may be added to the sealing composition to improve the physicomechanical properties and the optical properties of the display. The sealing composition is incompatible with the electrophoretic fluid and has a specific gravity no greater than that of the electrophoretic fluid. Upon solvent evaporation, the sealing composition forms a conforming seamless layer on top of the filled microcups. The top-sealing layer may be further hardened by heat, radiation or other curing methods. Sealing with a composition comprising a thermoplastic elastomer is particularly preferred. Examples of thermoplastic elastomers may include, but are not limited to, tri-block or di-block copolymers of styrene and isoprene, butadiene or ethylene/butylene, such as the Kraton™ D and G series from Kraton Polymer Company, polyurethanes, polyamides and polyesters. Crystalline rubbers such as poly(ethylene-co-propylene-co-5-methylene-2-norbornene) and other EPDM (ethylene propylene diene rubber terpolymer) from Exxon Mobil have also been found very useful.

Alternatively, the sealing composition may be dispersed into an electrophoretic fluid and filled into the microcups. The sealing composition is incompatible with the electrophoretic fluid and is lighter than the electrophoretic fluid. Upon phase separation, the sealing composition floats to the top of the filled microcups and forms a seamless sealing layer thereon after solvent evaporation. The sealing layer may be further hardened by heat, radiation or other curing methods.

The top-sealed microcups finally are laminated with the first electrode layer (11) which may be pre-coated with an adhesive layer (15).

Preferred materials for the adhesive layer may be formed from one adhesive or a mixture thereof selected from the group consisting of pressure sensitive, hot melt and radiation curable adhesives. The adhesives may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Polyurethanes and polymers or oligomers having a hydrogen bonding or adhesion promoting functionality such as carboxylic acid, acid anhydride, alcohol, pyridine, urea, amine, particularly tert-amine, pyrrolidone, oxazoline or derivatives thereof, are especially useful. The adhesive layer may be post cured by, for example, heat or radiation, such as UV, after lamination.

III. Embodiments of the Present Invention

The first aspect of the present invention is directed to a method for enhancing adhesion between components in an electrophoretic display, which method comprises adding a metal corrosion inhibitor, particularly an organic metal corrosion inhibitor, to an electrode protecting layer or display cell layer. Suitable metal corrosion inhibitors and organic metal corrosion inhibitors are those described below. The components in the electrophoretic display may be, but are not limited to, an electrode protecting layer, a display cell layer, an electrode layer, a permanent substrate layer or a temporary substrate layer.

The second aspect of the present invention is directed to a method for protecting an electrode layer and/or the solder thereon in an electrophoretic display from corrosion, rust or oxidation, which method comprises adding a metal corrosion inhibitor, particularly a copper (Cu), silver (Ag) or aluminum (Al) corrosion inhibitor, to at least one electrode protecting layer or a display cell layer in the electrophoretic display.

In the context of the present invention, the thickness of the electrode protecting layer preferably is less than 12 microns, more preferably less than 8 microns and most preferably less than 5 microns. The electrophoretic display comprise display cells filled with an electrophoretic fluid comprising charged pigment particles dispersed in a dielectric solvent or solvent mixture. In the context of the present invention, the electrode protecting layer preferably has a dielectric constant not lower than that of the dielectric solvent in the electrophoretic fluid. The dielectric constant of the dielectric solvent is usually in the range of 1.2 to 6, preferably in the range of 1.5 to 4.

Dielectric constants of typical commercially available polymers can be found in literature, such as "Electrical Properties of Polymers", by C. C. Ku and R. Liepins, Hanser Publishers, 1993 and "Prediction of Polymer Properties" $3^{rd}$ ed., by J. Bicerano, Marcel Dekker, Inc., 2002. Some of them are listed in Table 1 below:

TABLE 1

Dielectric Constants of Polymers (from "Electrical Properties of Polymers", by C. C. Ku and R. Liepins, Hanser Publishers, 1993)

| Polymers | ε | Temperature (° C.) | Frequency (Hz) |
|---|---|---|---|
| Polyvinyl alcohol/acetate), 0-1.5% acetate (Elvannol 50A-42) | 10.4 | 25 | $10^3$ |
| Polyether polyurethane (based on polyethylene oxide 600) | 10 | 18 | 10 |
| Polyurethane Elastomers | 4.7-9.53 | 25 | 60 |
| Polyfumaronitrile | 8.5 | 26 | $10^3$ |
| Poly (vinyl fluoride) | 8.5 | 25 | $10^3$ |
| Poly (vinylidene fluoride) | 8.4 | 25 | $10^3$ |
| Melamine/formaldehyde resin | 7.9 | 25 | 60 |
| Cellulose nitrate | 7.0-7.5 | 25 | 60 |
| Polysulfide | 7.3 | 25 | 60 |
| Phenol/aniline/formaldehyde (Bakelite BT-48-306) | 7.15 | 24 | $10^3$ |
| Chlorosulfonated polyethylene | 7.0 | 25 | 60 |
| Melamine/phenol resin | 7.0 | 25 | 60 |
| Methyl cellulose (Methocel) | 6.8 | 22 | $10^3$ |
| Poly (urea/formaldehyde) | 6.7 | 24 | $10^3$ |
| Cellulose acetate butyrate | 3.2-6.2 | 25 | $10^3$ |
| Cellulose acetate propionate | 3.2-6.2 | 25 | $10^6$ |
| Phenol/aniline/formaldehyde (Durite No. 221X) | 5.70 | 24 | 60 |
| Phenol/aniline/formaldehyde | 4.50 | 25 | $10^3$ |
| Cellulose triacetate | 3.2-4.5 | 25 | $10^3$ |
| Epoxy, standard (Bisphenol A) | 4.02 | 25 | 60 |
| Poly(methyl methacrylate)/polyvinyl chloride)alloy | 4.0 | 25 | 60 |
| Nylon 66 | 4.0 | 25 | 60 |
| Nylon 6/12 | 4.0 | 25 | 60 |
| Allyl diglycol carbonate | 2.0-3.9 | 25 | $10^4$ |
| Acetal(polyoxymethylene), Delrin | 3.7 | 25 | 60 |
| Nylon 6 | 3.7 | 25 | |
| Aniline-formaldehyde (Dilectene 100) | 3.68 | 25 | $10^3$ |
| Aromatic polyester-imides | 3.50 | 25 | $10^3$ |
| Aromatic polyimides | 3.5 | 25 | $10^3$ |
| Acrylonitril-Butadiene-Styrene (ABS) | 2.5-3.5 | 25 | 60 |
| Aromatic polyamideimides | 3.32 | 25 | $10^3$ |
| Poly (butadiene) | 3.3 | 25 | $10^6$ |
| Cellulose, regenerated (cellophane) | 3.2 | 25 | $10^3$ |
| Cellulose propionate | 3.2 | 25 | $10^6$ |
| Cycloaliphatic epoxy resin | 3.2 | 25 | 60 |
| Poly(ethylene terephthalate), thermoplastic | 3.2 | 25 | $10^3$ |
| Poly(butyl terephthalate) | 3.2 | 25 | 100 |
| Ethylene/vinyl acetate copolymer | 3.16 | 25 | 60 |
| Aromatic polyethers | 3.14 | 25 | 60 |
| Aromatic polysulfone | 3.13 | 23 | $10^3$ |
| Poly (methyl methacrylate), Plexiglas | 3.12 | 27 | $10^3$ |
| Ethyl cellulose, Ethocel LT-5 | 3.09 | 25 | $10^3$ |
| Poly (vinyl chloride), chlorinated | 3.08 | 25 | 60 |
| Poly (vinyl acetate) Elvacet 42A-900) | 3.07 | 25 | $10^3$ |
| Polysiloxane resin (methyl, phenyl, and methylphenyl) | 3.04 | 25 | $10^3$ |
| Poly(styrene/acrylonitrile) (SAN) | 2.6-3.0 | 25 | $10^4$ |
| Polycarbonate | 2.99 | 25 | $10^3$ |
| Methyl and methylphenyl polysiloxane (DC 550) | 2.90 | 20 | $10^3$ |
| Poly(ethyl methacrylate) | 2.75 | 22 | $10^3$ |
| Poly (methyl methacrylate) | 2.68 | 25 | $10^3$ |
| Poly(butyl methacrylate) | 2.62 | 24 | 100 |
| Poly(2,6-dimethyl-1, 4-phenylene ether) | 2.6 | 25 | $10^3$ |
| Fluorinated ethylene/propylene copolymer (FEP) | 2.0-2.5 | 25 | $10^3$ |
| SBR (75% butadiene) | 2.5 | 26 | $10^3$ |
| Polystyrene | 2.4 | 25 | $10^3$ |
| Poly(98–99% isobutylene/1-2% isoprene) (GR-l; butyl rubber) | 2.38 | 25 | $10^3$ |

TABLE 1-continued

Dielectric Constants of Polymers (from "Electrical Properties of Polymers", by C. C. Ku and R. Liepins, Hanser Publishers, 1993)

| Polymers | ε | Temperature (° C.) | Frequency (Hz) |
|---|---|---|---|
| Polyethylene, ultra high MW | 2.3 | 25 | $10^3$ |
| Polyethylene, medium density | 2.2 | 25 | $10^3$ |
| Polytetrafluoroethylene | 2.0 | 25 | $10^3$ |

The two methods significantly improve the handleability and reliability of the electrode layer and in turn the performance and reliability of the EPD, without the tradeoffs caused by conventional methods such as the use of a solder mask or gold coating.

Examples of the electrode layers which may be protected by the present method may include, but are not limited to, copper, silver or aluminum common electrodes, row or column electrode layers for passive matrix EPDs, printed circuit boards with or without via holes and thin film transistor (TFT) back planes.

In the context of all aspects of the present invention, useful metal corrosion inhibitors may include, but are not limited to, corrosion inhibiting pigments such as zinc chromate, zinc tetroxy chromate, strontium chromate, red lead, basic lead silicochromate, zinc molybdates, calcium molybdates, zinc phosphomolybdate or calcium zinc phosphomolybdate; organic metal corrosion inhibitors, including triazoles such as mercaptobenzotriazole (MBT), benzotriazole, 1,1'-phthaloyl-bis(benzotriazole), thiadiazoles such as (1,3,4-thiadiazole-2,5-dithiol) or bismuthiol or 2-amino-5-mercapto-1,3,4-thiad iazole (AMT), thiazoles such as 5-benzylidene-2,4-dioxotetrahydro-1,3-thiazole (BDT), 5-(4'-isopropyl benzylidene)-2,4-dioxotetrahydro-1,3-thiazole (IPBDT), 5-(3'-thenylidene)-2,4-dioxotetrahydro-1,3-thiazole (TDT) or 5,-(3',4'-dimethoxybenzylidene)-2,4-dioxotetrahydro-1,3-thiazole (MNDT), tetrazoles, phenidones, pyrimidines, imidazolines or a derivative thereof; and other passivating, precipitation or cathodic corrosion inhibitors as disclosed in references, such as Pure Appl. Chem., 73 (12), 1861 (2001); CHEMTECH 27 (4), 40 (1997); "Corrosion Inhibitors—An Industrial Guide" (2nd Edition) by Flick, E. W. (1993) William Andrew Publishing/Noyes and "Plastic Coatings for Electronics" Ch. 4 and 6, by James J. Licari (1980), Robert E. Krieger Publishing Co. Triazoles and thiazoles are generally considered as the preferred.

The third aspect of the present invention is directed to an electrode protecting layer composition comprising a metal corrosion inhibitor. The electrode layer preferably has the properties (i.e., thickness and/or dielectric constant) as described above.

The electrode protecting layer may be an adhesive layer (15). In this case, the composition may comprise an adhesive and a metal corrosion inhibitor as described above. Suitable adhesives may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, polyesters, alkyds, silicones, ethylene-vinylacetate copolymers, epoxides, multifunctional acrylates, vinyls, vinylethers, and oligomers, polymers, copolymers or blends threreof. The thickness of the adhesive layer is usually in the range of about 0.2 to about 12 um, preferably about 1 to about 8 um and more preferable about 3 to about 5 um.

The electrode protecting layer may be a top-sealing layer (14). In this case, the sealing composition may comprise a sealing material and a metal corrosion inhibitor. Suitable sealing materials may include, but are not limited to, thermoplastic elastomers, polyurethanes, polyesters, acrylics, polyamides, polyvalent acrylates or methacrylates, cyanoacrylates, polyvalent vinyls (such as vinylbenzene, vinylsilane or vinylether), polyvalent epoxides, polyvalent isocyanates, polyvalent allyl and oligomers or polymers containing crosslinkable functional groups. The sealing composition preferably has a specific gravity no greater than that of the electrophoretic fluid filled in the display cells and is also preferably immiscible with the electrophoretic fluid. The thickness of the sealing layer is usually in the range of about 0.5 to about 12 um, preferably about 1 to about 8 um and more preferably in the range of about 2 to about 5 um. The metal corrosion inhibitor is preferably insoluble in the electrophoretic fluid.

The electrode protecting layer may be a primer layer (13). In this case, the composition may comprise a primer layer forming material and a metal corrosion inhibitor. Suitable primer layer forming materials may include, but are not limited to, thermoplastic or thermoset materials or precursors thereof. Examples of primer layer forming materials may include the adhesive polymers mentioned above and multifunctional acrylates or methacrylates, vinylbenzenes, vinylethers, epoxides or oligomers and polymers thereof. A multifunctional acrylate and oligomers thereof are usually preferred. The thickness of the primer layer is usually in the range of about 0.05 to about 5 um and preferably in the range of about 0.1 to about 1 um.

Additional compositions for sealing and adhesive layers suitable for the present invention are disclosed in co-pending application Ser. No. 10/651,540 filed Aug. 29, 2003, Ser. No. 10/788,628, filed Feb. 26, 2004 and Ser. No. 10/762,196 filed Jan. 21, 2004, the contents of all of which are incorporated herein by reference in their entirety. In the context of the present invention, the composition may comprise a high dielectric polymer or oligomer, a metal corrosion inhibitor and optionally a crosslinking agent. An alternative composition may comprise a high dielectric polymer or oligomer, a radically or photochemically graftable polymer, a metal corrosion inhibitor and optionally a crosslinking agent. Another alternative composition may comprise a high dielectric polymer or oligomer, a radiation curable composition and a metal corrosion inhibitor. A further alternative composition may comprise a high dielectric polymer or oligomer, a radically or photochemically graftable polymer, a radiation curable composition and a metal corrosion inhibitor.

In the electrode protecting layer composition, the metal corrosion inhibitor may take up about 0.1% to about 5%, preferably about 0.5% to about 2%, by weight of the dried adhesive, sealing or primer layer.

The metal corrosion inhibitor may be present in more than one electrode protecting layer.

The fourth aspect of the present invention is directed to a display cell layer formed from a composition comprising a metal corrosion inhibitor.

For the microcup-based electrophoretic displays, the display cell layer comprises microcups filled with an electrophoretic fluid and top-sealed with a sealing layer. The display cell layer composition of the present invention may comprise a material for the formation of the microcups and a metal corrosion inhibitor. Suitable materials for the formation of the microcups may include the thermoplastics, thermosets or precursors thereof as described in Section II above.

For the microcapsule-based electrophoretic displays, the display cell layer comprises the microcapsules filled with an electrophoretic fluid and the filled microcapsules are immobilized within a polymeric matrix. The display cell layer composition of the present invention, in this case, may comprise a material for the formation of the polymeric matrix and a metal corrosion inhibitor. Certain suitable materials for the formation of the polymeric matrix are disclosed in U.S. Pat. No. 5,930,026. Examples of the suitable materials, in the context of the present invention, may include polyvinyl alcohol derivatives, gelatins, cellulose derivatives, polyurethanes, polyamides, polyesters, acrylics, styrene copolymers, epoxides, UV curable monomers or oligomers and other resins.

In the display cell layer composition, the metal corrosion inhibitor may take up about 0.05% to about 5%, preferably about 0.2% to about 2%, by weight of the dried display cell layer.

The electrode protecting layer composition and the display cell layer composition of the present invention may further comprise a colorant. The colorant may be a dye or pigment and is added to enhance the contrast ratio or other properties of the electrophoretic display. Suitable dyes or pigments usually have an absorption band in the range of about 320 to about 800 nm, more preferably about 400 to about 700 nm. They may include, but are not limited to, metal phthalocyanines or naphthalocyanines (wherein the metal may be Cu, Al, Ti, Fe, Zn, Co, Cd, Mg, Sn, Ni, In, Ti, V or Pb), metal porphines (wherein the metal may be Co, Ni or V), azo (such as diazo or polyazo) dyes, squaraine dyes, perylene dyes and croconine dyes. Other dyes or pigments which may generate or transport charge in their excited state or ground state would also be suitable. Examples of this type of dyes or pigments are those typically used as charge generating materials in organic photoconductors (See P. M. Bosenberger and D. S. Weiss, "Photoreceptors: Organic Photoconductors" in "Handbook of Imaging Materials", A. S. Diamond ed., pp 379, (1991), Marcel Dekker, Inc).

The incorporation of a dye or pigment into an electrode protecting layer or display cell layer allows the electrode protecting layer or display cell layer to become also a contrast enhancing layer.

Particularly preferred dyes or pigments are disclosed in a co-pending U.S. application Ser. No. 10/618,257 filed on Jul. 10, 2003 (corresponding to WO04/10206), the content of which is incorporated herein by reference in its entirety.

The concentration of the dye or pigment may range from about 0.1% to about 30%, preferably from about 2% to about 20%, by weight of the total solid content of the layer.

Other additives such as surfactants, dispersion aids, thickeners, crosslinking agents, vulcanizers, nucleation agents or fillers may also be added to the electrode protecting layer composition or display cell layer composition to enhance the coating quality and display performance.

The fifth aspect of the present invention is directed to an electrophoretic display comprising at least one electrode protecting layer which is formed from a composition comprising a metal corrosion inhibitor, as described above.

The sixth aspect of the present invention is directed to an electrophoretic display which comprises a display cell layer formed from a composition comprising a metal corrosion inhibitor, as described above. In one embodiment, the display cell layer may be sandwiched between two electrode layers. In another embodiment, the display cell layer may be sandwiched between one permanent substrate layer (such as an insulting layer) and an electrode layer.

Figure 2A:
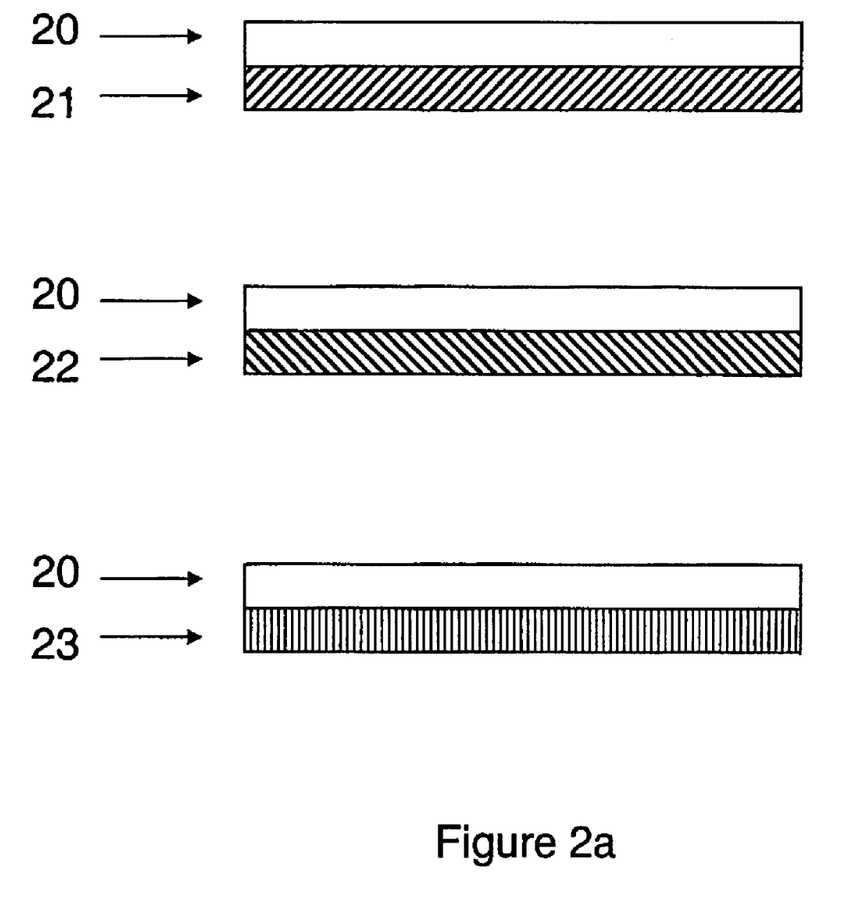
FIGS. 2a-2d illustrate different types of composite films of the present invention.
Figure 2B:
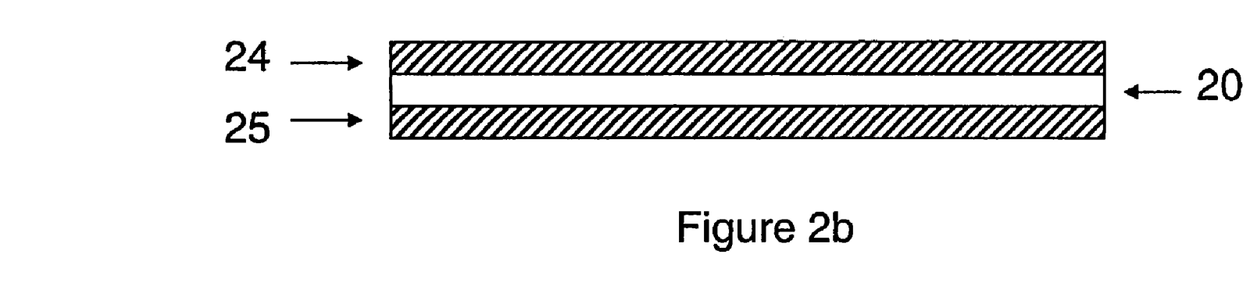
Figure 2C:
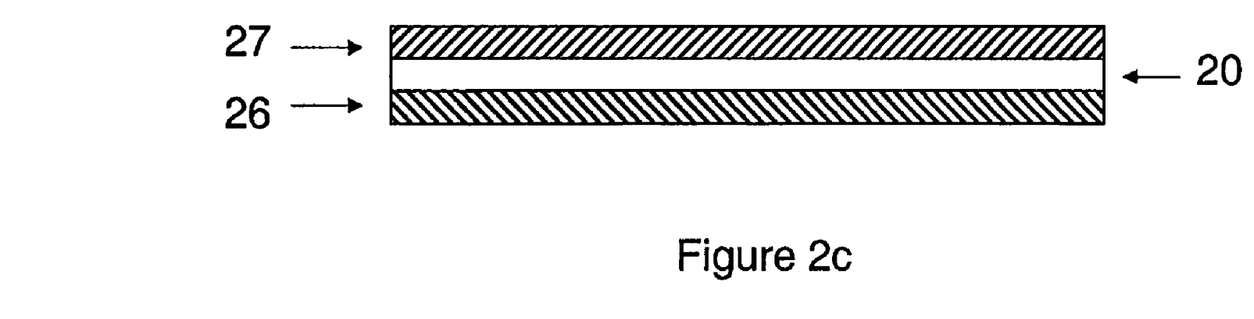
Figure 2D:
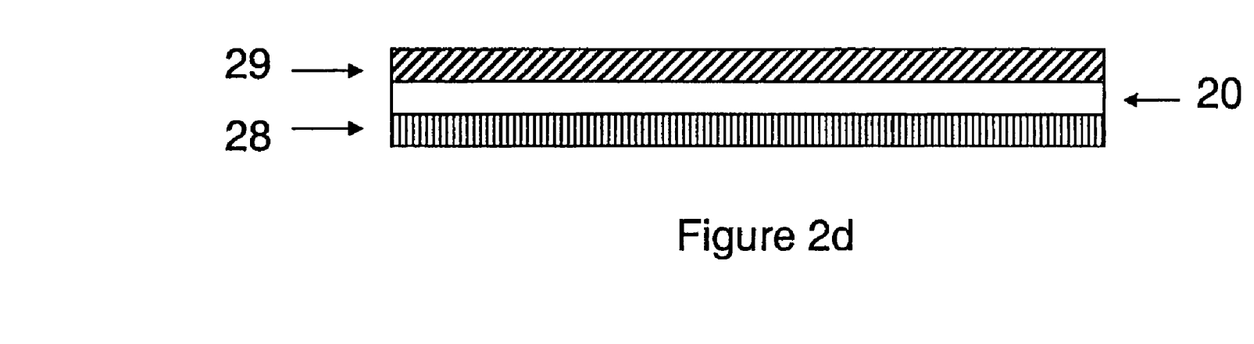

The seventh aspect of the present invention is directed to different types of composite films comprising an adhesive layer formed from a composition comprising a metal corrosion inhibitor. In one embodiment as shown in FIG. 2a, the composite film may comprise the adhesive layer (20) laminated on a temporary substrate layer (21), and a permanent substrate layer (22) or an electrode layer (23). In another embodiment as shown in FIG. 2b, the composite film may comprise the adhesive layer (20) sandwiched between two temporary substrate layers (24 and 25), such as release liners. In a further embodiment as shown FIG. 2c, the composite film may comprise the adhesive layer (20) sandwiched between a permanent substrate layer (26) and a temporary substrate layer (27). In yet another embodiment as shown in FIG. 2d, the composite film may comprise the adhesive layer (20) sandwiched between an electrode layer (28) and a temporary substrate layer (29).

Figure 3:
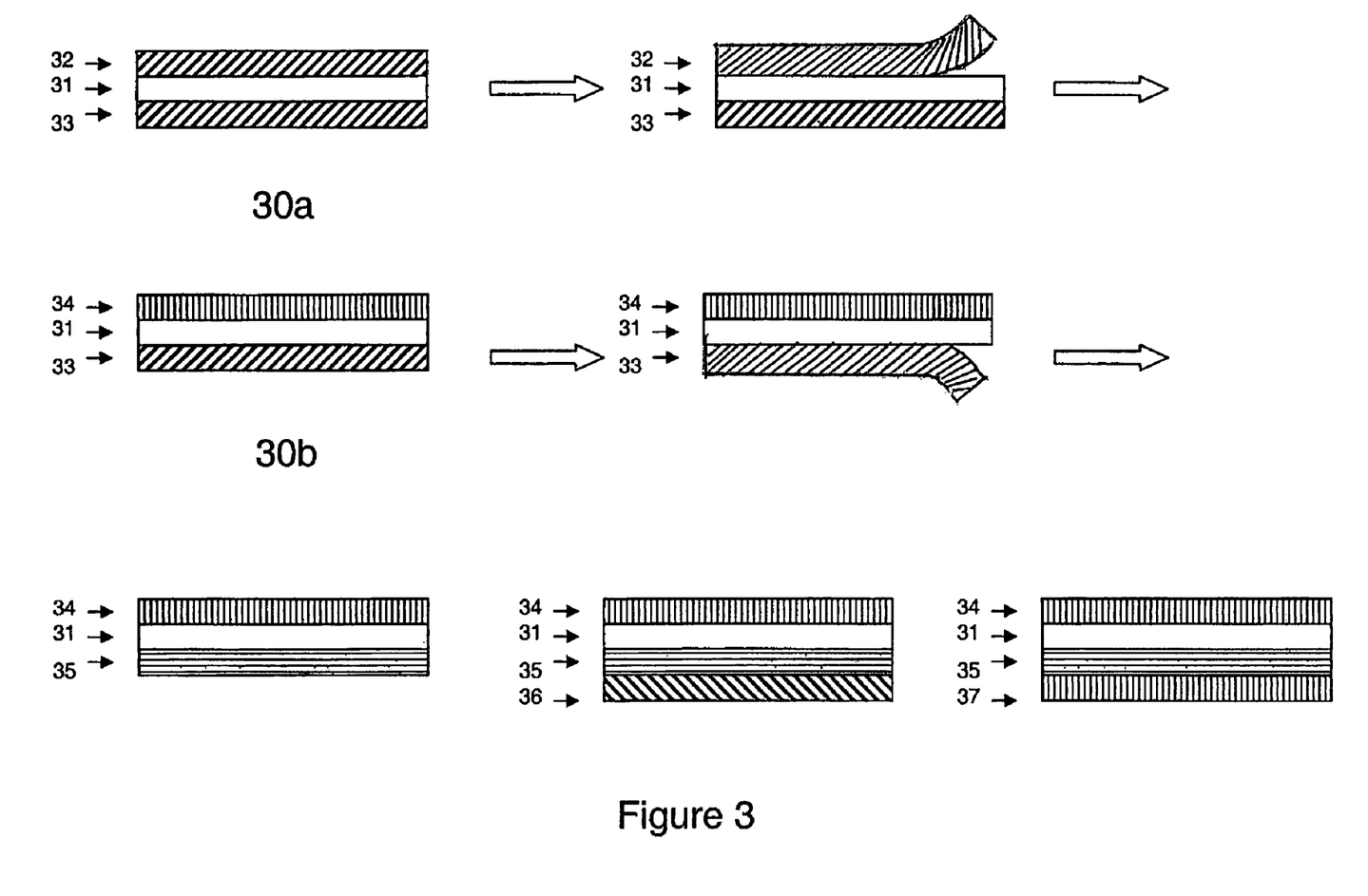
FIG. 3 is an example of how the composite films are processed.

These composite films are useful in many ways. An example is shown in FIG. 3. An electrode layer supplier may simply peel off one (32) of the two temporary substrate layers (32 and 33) from a composite film (30a) comprising the adhesive layer (31) sandwiched between the two temporary substrate layers (32 and 33) and laminate the remaining composite film onto an electrode layer (34), immediately after the electrode layer is prepared, to form a composite film (30b) comprising the adhesive layer (31) sandwiched between the temporary substrate layer (33) and the electrode layer (34). This composite film (30b) may then be shipped, without the risk of degradation or corrosion of the electrode layer or the tradeoffs caused by the use of a solder mask or gold coating, to a down stream manufacturer who in turn may peel off the temporary substrate layer (33) and laminate the remaining composite film onto a display cell layer (35). The display cell layer may be pre-laminated with a permanent substrate layer (36) or an electrode layer (37). Alternatively, the permanent substrate layer (36) or the electrode layer (37) may be laminated over the display cell layer after the display layer has been laminated onto the adhesive layer (31) of the composite film (30b). In one embodiment, the display cell layer may be formed from a composition which does not contain a metal corrosion inhibitor. In another embodiment, the display cell layer may be formed from a composition which comprises a metal corrosion inhibitor. The sealing layer in the microcup-based display cell layer may be formed from a composition which does not contain a metal corrosion inhibitor. Alternatively, the sealing layer may be formed from a composition which comprises a metal corrosion inhibitor.

EXAMPLES

The following examples are given to enable those skilled in the art to more clearly understand and to practice the present invention. They should not be considered as limiting the scope of the invention, but merely as being illustrative and representative thereof.

Example 1

Effect of Benzotriazole in an Adhesive Layer

Seven samples were tested in this example:

Sample #1: a fresh PCB with a bright & shiny surface

Sample #2: a fresh PCB washed with Copper Oxide Remover® (supplied by Transene Company, Inc., Danvers, Mass. 01923) followed by rinsing with water and drying in a nitrogen box with a nitrogen flow Sample #3: a fresh PCB washed with Bright Copper Cleaner® (supplied by Transene Company, Inc., Danvers, Mass. 01923) followed by rinsing with water and drying in a nitrogen box with a nitrogen flow (According to the supplier, Bright Copper Cleaner® cleans the board and leaves a very thin protective film on the surface.)

Sample #4: Sample #2 laminated with a blue colored adhesive which was prepared by dispersing 12% by weight of a blue dye, Orasol Blue GN (a Cu phthalocyanine dye from Ciba Specialty Chemicals, Inc.), in a solvent-based polyurethane adhesive (S6148, from Huntsman).

Sample #5: Sample #2 laminated with a blue colored adhesive as described for Sample #4 but also containing 2% of benzotriazole Sample #6: Sample #3 laminated with a blue colored adhesive as described for Sample #4

Sample #7: Sample #3 laminated with a blue colored adhesive as described for Sample #4 but also containing 2% of benzotriazole The gloss and haze data at 20° C. for the seven samples were taken first, after which the samples were placed in a chamber under accelerated conditions (50° C. and 80% relative humidity) for 24 hours.

After storage, Samples #1, #2 and #3 were severely oxidized and showed reddish or purplish colors with an uneven pattern. Neither Copper Oxide Remover® nor Bright Copper Cleaner® was effective in protecting the PCB from corrosion or oxidation under accelerated conditions. In addition, once the copper surface of the PCB was oxidized, it was extremely difficult to restore the surface to the original state.

The color of the copper surface of Samples #4 and #6 became darker after 24 hour storage under the accelerated conditions.

The color of the copper surface of Samples #5 and #7 (each laminated with a blue colored adhesive containing 2% of benzotriazole) remained bright and shiny after 24 hour storage under accelerated conditions. There is no difference in the surface color between Sample #5 and Sample #7.

Table 1 summarizes the gloss and haze data at 20° for the seven samples before and after storage.

TABLE 1

|  |  | Sample #1 | Samples #2 | Samples #3 | Samples #4 & #6 | Samples #5 & #7 |
|---|---|---|---|---|---|---|
| Before Storage | Gloss | 180 | 182 | 148 | 174 | 176 |
|  | Haze | 1154 | 1520 | 1440 | 1342 | 1396 |
| After Storage | Gloss | 31.4 | 43.9 | 33 | 33.7 | 237 |
|  | Haze | 532 | 808 | 754 | 763 | 1283 |

From Table 1, it can be seen that after 24 hour storage under accelerated conditions, only Samples #5 and #7 showed the similar surface properties in terms of gloss and haze to those of the original fresh samples before being placed in the chamber.

A further study was conducted in which Sample #5 and #7 were placed in the chamber and the copper surface of the samples still retained the original gloss and haze properties after two week storage.

A 180° peeling test was also performed on Samples #4-7. As shown in Table 2 below, the adhesion between the adhesive layer and the printed circuit board was significantly improved with the samples contained 2% of benzotriazole.

TABLE 2

|  | Samples #4 and #6 | Samples #5 and #7 |
|---|---|---|
| Peeling Force | 0.007 N/mm | 0.0325 N/mm |

Another test was also performed to ensure that the addition of 2% of benzotriazole would not affect the switching performance of an electrophoretic display. Table 3 summarizes the results.

TABLE 3

|  | $T_{on}$ | $T_{off}$ | Contrast Ratio |
|---|---|---|---|
| Samples #4 and #6 | 190 | 350 | 7.2 |
| Samples #5 and #7 | 210 | 370 | 7.2 |

The results showed that the addition of 2% of benzotriazole in the adhesive layer did not affect either the response time ($T_{on}$ and $T_{off}$) or the contrast ratio.

Example 2

Effect of Benzotriazole in a Sealing Layer

A sealing layer composition consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl]2-morpholinopropan-1-one), 40.8 parts by weight of MEK, 40.8 parts by weight of IPAc and 4.3 parts by weight of CHO (cyclohexanone) was tested.

A fresh printed circuit board laminated with a sealing layer prepared from the composition as described above without benzotriazole was compared against a fresh printed circuit board laminated with a sealing layer prepared from the composition as described above but also containing 2% of benzotriazole. The two samples were stored in a chamber under accelerated conditions (50° C. and 80% relative humidity) for 24 hours. The sample laminated with the sealing layer containing 2% of benzotriazole showed no color change whereas the sample laminated with the sealing layer without benzotriazole became darker.

The display performance was also evaluated. The results are summarized in Table 4.

TABLE 4

|  | $T_{on}$ | $T_{off}$ | Contrast Ratio |
|---|---|---|---|
| Sealing Layer w/o Benzotriazole | 210 | 360 | 7.6 |
| Sealing Layer with Benzotriazole | 250 | 390 | 8.9 |

No deterioration of display switching performance was observed when benzotriazole was added to the sealing layer composition.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A method for enhancing adhesion between components of an electrophoretic display comprising two substrate layers and a display cell layer sandwiched between the two substrate layers, said display cell layer comprises display cells filled with an electrophoretic fluid comprising charged pigment particles dispersed in a dielectric solvent or solvent mixture, the method comprises forming
    (i) a sealing layer on the open side of the display cells; or
    (ii) a primer layer present between the display cell layer and one of the two substrate layers; or
    (iii) an adhesive layer; or
    (iv) the display cells;
from a composition comprising a metal corrosion inhibitor, wherein said metal corrosion inhibitor is a thiadiazole, thiazole, tetrazole, phenidone, pyrimidine, or imidazoline.

2. The method of claim 1 wherein said metal corrosion inhibitor is a thiazole.

3. The method of claim 1 wherein said components are selected from the group consisting of an electrode layer, said two substrate layers, said display cell layer, said sealing layer, said primer layer and said adhesive layer.

4. The method of claim 1 wherein sealing layer, primer layer or adhesive layer has a dielectric constant not lower than that of the dielectric solvent or solvent mixture.

5. The method of claim 4 wherein said sealing layer, primer layer or adhesive layer has a thickness of less than 12 microns.

6. A method for protecting an electrode layer in an electrophoretic display from corrosion, rust or oxidation, wherein said electrophoretic display comprises:
    a) at least one electrode layer;
    b) a display cell layer which comprises display cells filled with an electrophoretic fluid comprising charged pigment particles dispersed in a dielectric solvent or solvent mixture; and
    c) at least one sealing layer, primer layer or adhesive layer, wherein the sealing layer, primer layer or adhesive layer has a dielectric constant not lower than that of the dielectric solvent or solvent mixture,
    the method comprises forming said sealing layer, primer layer, adhesive layer, or display cells from a composition comprising a metal corrosion inhibitor selected from the group consisting of (i) a corrosion inhibiting pigment, (ii) a thiadiazole, thiazole, tetrazole, phenidone, pyrimidine, or imidazoline, and (iii) a passivating corrosion inhibitor, a precipitation corrosion inhibitor, or a cathodic corrosion inhibitor.

7. The method of claim 6 wherein said corrosion inhibiting pigment is zinc chromate, zinc tetroxy chromate, strontium chromate, red lead, basic lead silicochromate, zinc molybdates, calcium molybdates, zinc phosphomolybdate or calcium zinc phosphomolybdate.

8. The method of claim 6 wherein said metal corrosion inhibitor is a thiadiazole, thiazole, tetrazole, phenidone, pyrimidine, or imidazoline.

9. The method of claim 6 wherein said metal corrosion inhibitor is a thiazole.

* * * * *